(12) United States Patent
Ishida et al.

(10) Patent No.: US 11,758,064 B2
(45) Date of Patent: Sep. 12, 2023

(54) READING DEVICE AND IMAGE FORMING APPARATUS

(71) Applicants: Masahiro Ishida, Kanagawa (JP);
Shogo Nakamoto, Kanagawa (JP);
Takuya Okamoto, Kanagawa (JP);
Hiroki Hamashoji, Kanagawa (JP)

(72) Inventors: Masahiro Ishida, Kanagawa (JP);
Shogo Nakamoto, Kanagawa (JP);
Takuya Okamoto, Kanagawa (JP);
Hiroki Hamashoji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/930,114

(22) Filed: Sep. 7, 2022

(65) Prior Publication Data

US 2023/0143978 A1 May 11, 2023

(30) Foreign Application Priority Data

Nov. 5, 2021 (JP) ................. 2021-181209

(51) Int. Cl.
*H04N 1/04* (2006.01)
*H04N 1/00* (2006.01)

(52) U.S. Cl.
CPC ..... *H04N 1/00708* (2013.01); *H04N 1/00737* (2013.01); *H04N 1/00761* (2013.01); *H04N 1/00827* (2013.01)

(58) Field of Classification Search
None
See application file for complete search history.

(56) References Cited

U.S. PATENT DOCUMENTS

| 5,058,188 A | * | 10/1991 | Yoneda | H04N 1/1072 |
| | | | | 358/473 |
| 7,014,289 B1 | * | 3/2006 | Matsuda | B41J 2/2135 |
| | | | | 347/19 |
| 2003/0178585 A1 | * | 9/2003 | Tseng | H04N 1/00761 |
| | | | | 250/559.24 |

(Continued)

FOREIGN PATENT DOCUMENTS

| JP | 10-307347 | 11/1998 |
| JP | 2002-199139 | 7/2002 |

(Continued)

*Primary Examiner* — Dung D Tran
(74) *Attorney, Agent, or Firm* — IPUSA, PLLC

(57) ABSTRACT

A reading device includes a carriage movable in a sub-scanning direction, an optical sensor mounted on the carriage, the optical sensor being configured to scan an object placed on a contact glass, a reference scale used as a reference when a dimension of the object is computed based on an image obtained as the optical sensor scans the object, a flat gauge to be scanned by the optical sensor to calculate a corrective value used to correct the image obtained by the optical sensor, and circuitry to calculate the corrective value based on a scanned image including the reference scale and the flat gauge obtained by the optical sensor, and correct, based on the corrective value, a measurement image including an image of the object and an image of the reference scale obtained by the optical sensor and compute the dimension of the object based on the corrected measurement image.

8 Claims, 15 Drawing Sheets

(56) References Cited

U.S. PATENT DOCUMENTS

| | | | |
|---|---|---|---|
| 2006/0262330 A1* | 11/2006 | Koase | B41J 29/393 |
| | | | 358/1.2 |
| 2007/0211341 A1* | 9/2007 | Hashizume | H04N 1/1013 |
| | | | 359/489.15 |
| 2011/0122455 A1* | 5/2011 | Elliot | H04N 1/00034 |
| | | | 358/488 |
| 2011/0181920 A1* | 7/2011 | Kim | H04N 1/00737 |
| | | | 358/474 |
| 2016/0142586 A1 | 5/2016 | Ishida et al. | |
| 2019/0361387 A1 | 11/2019 | Ishida | |
| 2021/0377400 A1 | 12/2021 | Ishida | |
| 2021/0377418 A1 | 12/2021 | Ishida | |
| 2023/0121999 A1* | 4/2023 | Ishida | H04N 1/0455 |
| | | | 358/497 |

FOREIGN PATENT DOCUMENTS

| | | |
|---|---|---|
| JP | 2006-093952 | 4/2006 |
| JP | 2011-151548 | 8/2011 |

* cited by examiner

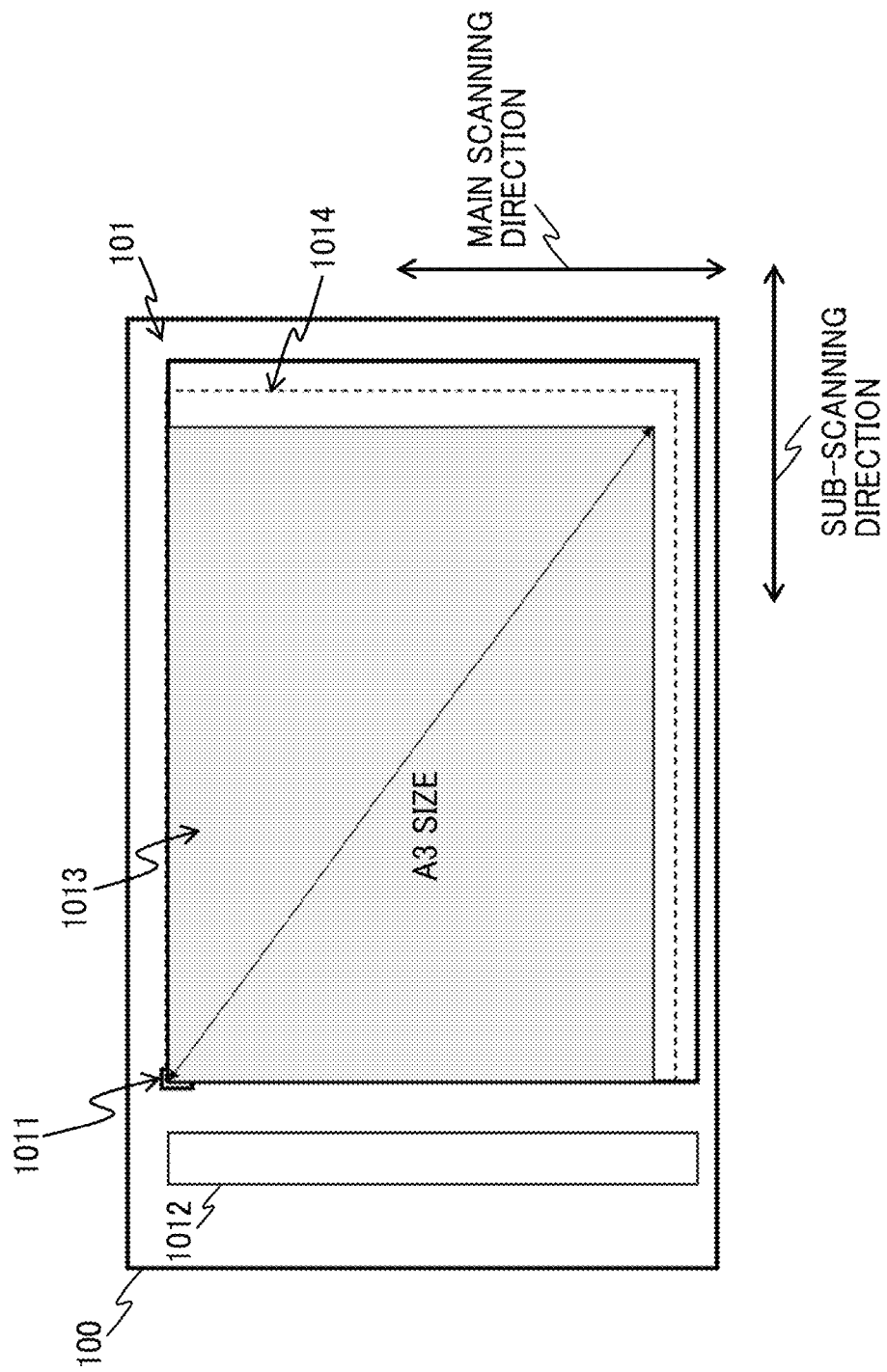

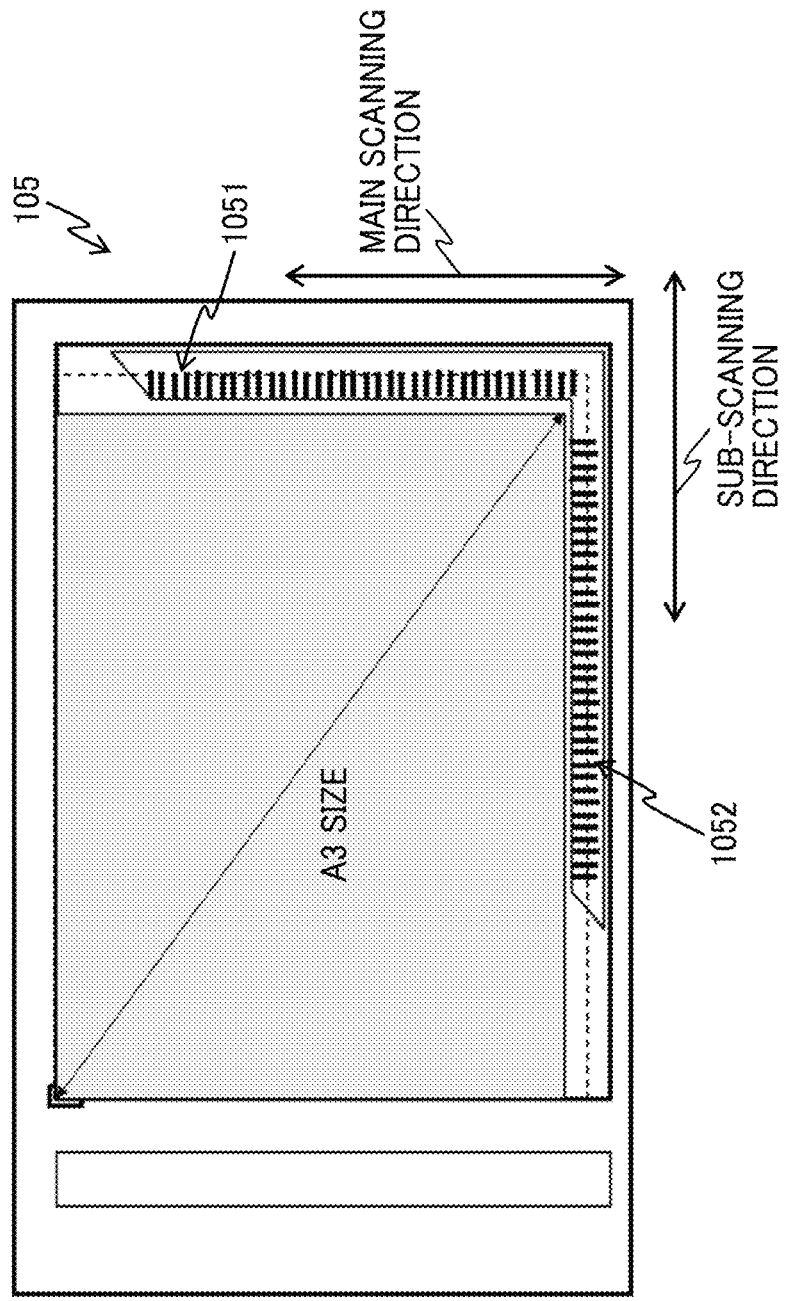

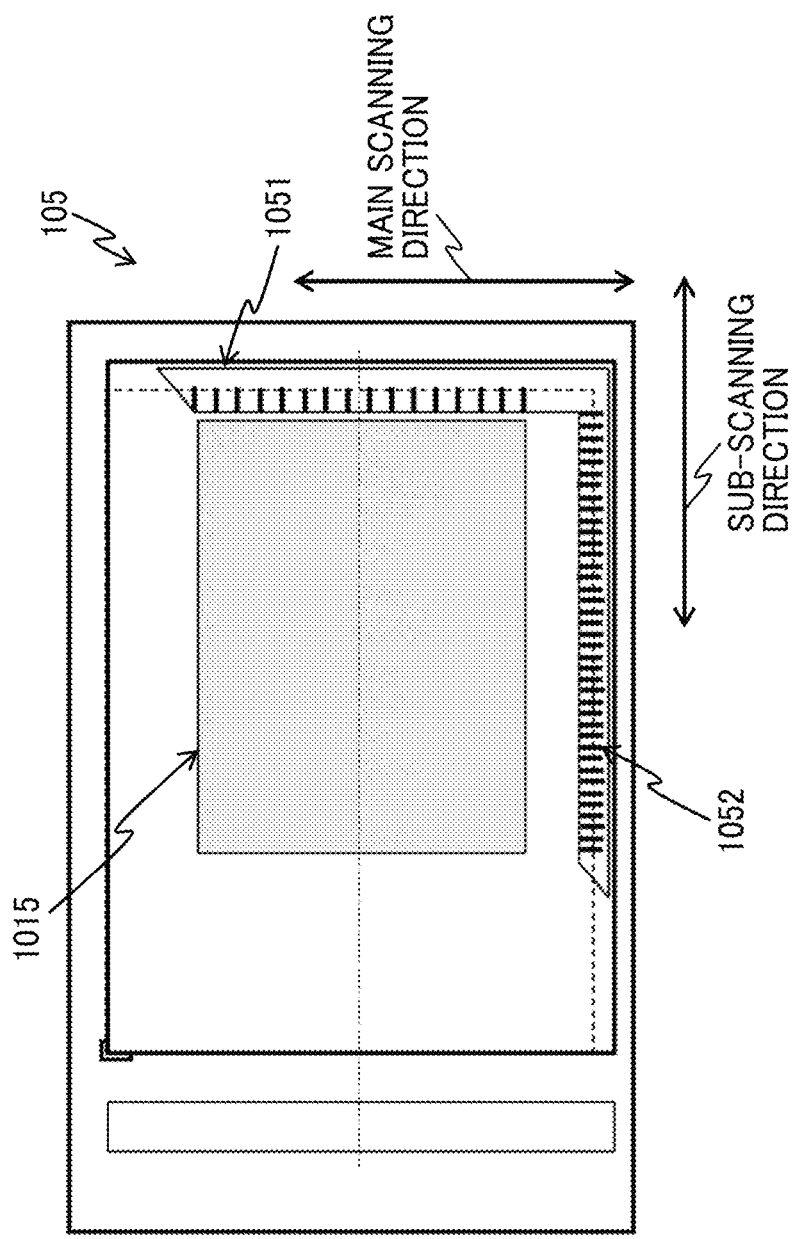

READING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2021-181209, filed on Nov. 5, 2021, in the Japan Patent Office, the entire disclosure of which is hereby incorporated by reference herein.

BACKGROUND

Technical Field

Embodiments of the present disclosure relate to a reading device and an image forming apparatus.

Background Art

In the related art, reading devices that optically scan, for example, the shape of an object are known. Typically, the reading devices known in the related art have a function to scan the object to be scanned placed on a contact glass with an optical sensor mounted on a carriage that moves along the contact glass. As a result, the shape of the object to be scanned is obtained, the image data of the object is generated.

In such reading devices known in the art, for example, a reference scale that is made of a hard component and has ticks at predetermined intervals is placed on the reading face, and an image that includes the object and the reference scale is scanned. Moreover, the position of the object on the scanned image with reference to the ticks of the scale is measured in such reading devices known in the art. Due to such a configuration, the dimensions of the object on the image can be measured.

SUMMARY

Embodiments of the present disclosure described herein provide a reading device including a carriage movable in a sub-scanning direction, an optical sensor mounted on the carriage, the optical sensor being configured to scan an object placed on a contact glass, a reference scale used as a reference when a dimension of the object is computed based on an image obtained as the optical sensor scans the object, a flat gauge to be scanned by the optical sensor to calculate a corrective value used to correct the image obtained by the optical sensor, and circuitry configured to calculate the corrective value based on a scanned image including the reference scale and the flat gauge obtained by the optical sensor, and correct, based on the corrective value, a measurement image including an image of the object and an image of the reference scale obtained by the optical sensor and compute the dimension of the object based on the corrected measurement image. In the reading device, the reference scale extends in a main scanning direction orthogonal to the sub-scanning direction outside a range of image acquisition in which the optical sensor scans the object to obtain the image of the object as the carriage moves and inside a maximum movement range in which the carriage is movable and the optical sensor obtains the image of the object, and the flat gauge is arranged on the contact glass inside the range of image acquisition, where a plurality of first reference lines drawn on a face of the contact glass are oriented in the main scanning direction.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 6 is a plan view of a scanner unit according to an embodiment of the present disclosure.

FIG. 7 is a diagram illustrating an arrangement of a reference scale provided for a scanner unit according to an embodiment of the present disclosure.

FIG. 8 is a diagram illustrating a scanning range when an object to be scanned is a three-dimensional object, according to an embodiment of the present disclosure.

Figure 1:
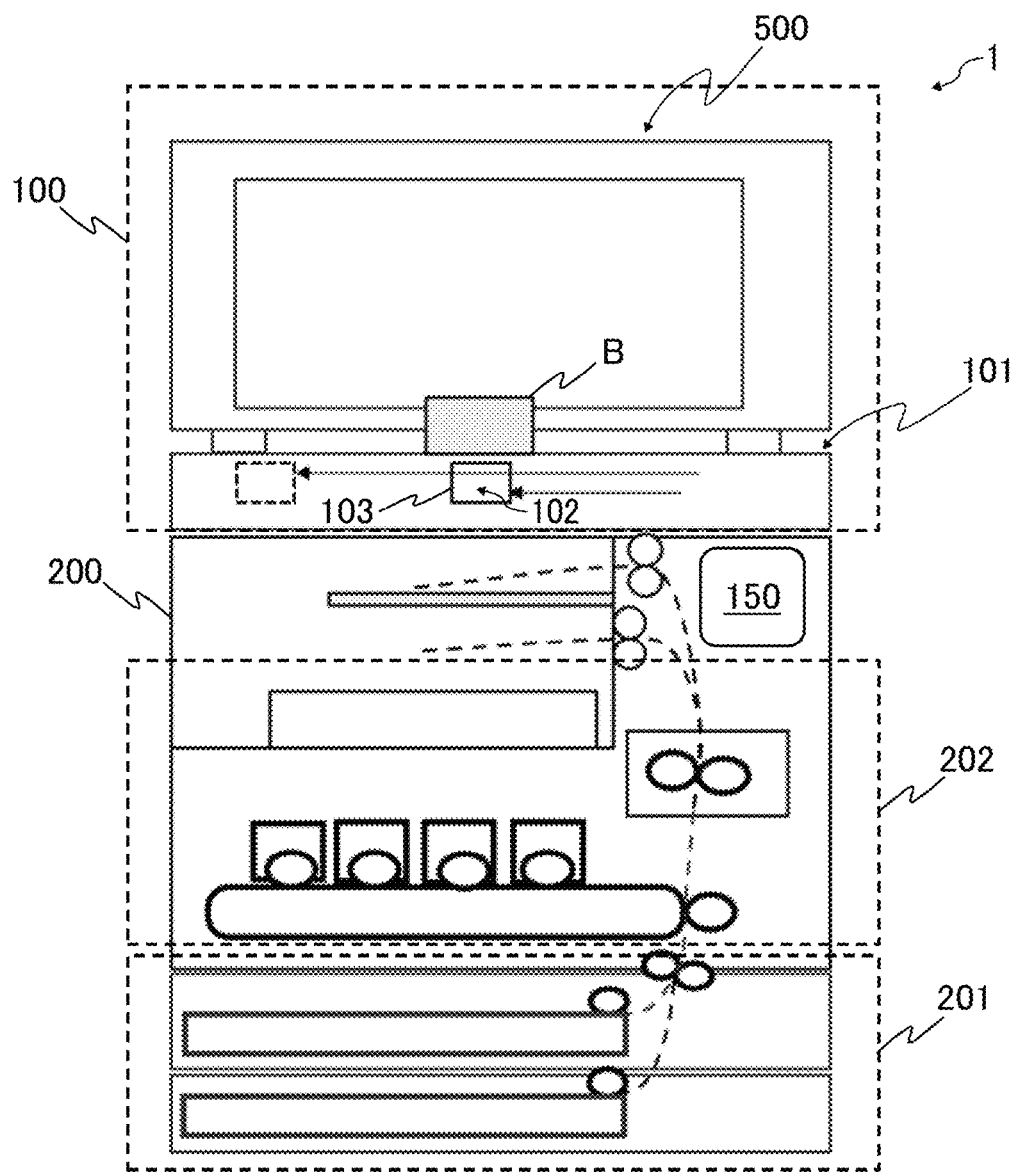
FIG. 1 is a schematic diagram illustrating a configuration of a multifunction peripheral (MFP) that serves as an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An image forming apparatus and a reading device according to an embodiment of the present disclosure are described below with reference to the drawings.

FIG. 1 is a schematic diagram illustrating a configuration of a multifunction peripheral (MFP) 1 that serves as an image forming apparatus according to an embodiment of the present disclosure.

The MFP 1 is provided with a scanner unit 100 that serves as a reading device according to embodiments of the present disclosure and an image forming unit 200 that forms an image on a sheet-like recording medium. The device according to embodiments of the present disclosure may be applied to a single unit of reading device such as the scanner unit 100 instead of the MFP 1.

The scanner unit 100 according to the present embodiment includes a contact glass 101, an optical sensor 102, and a carriage 103. The contact glass 101 according to the present embodiment serves as a mounting table on which an object to be scanned B is to be mounted. The optical sensor 102 is an image sensor that irradiates the object to be scanned B placed on the contact glass 101 with light and obtains an optical image of the object to be scanned B based on the reflected light. The carriage 103 moves in the sub-scanning direction with respect to the object to be scanned B such that the optical sensor 102 can scan the object to be scanned B.

The optical sensor 102 is arranged in a line in the main scanning direction orthogonal to the sub-scanning direction in which the carriage 103 moves. The scanner unit 100 according to the present embodiment is configured to obtain an image of the entirety of the object to be scanned B as the object to be scanned B is scanned while moving the line in the sub-scanning direction in which the optical sensor 102 scans the object.

The scanner unit 100 according to the present embodiment is also provided with an automatic document feeder (ADF) 500 that serves as a medium conveyance unit that conveys a sheet-like object to be scanned B to the contact glass 101.

The image forming unit 200 according to the present embodiment is provided with a medium accommodating unit 201 that stores a sheet P that serves as a sheet-like medium, and an image forming device 202 that forms an image on the sheet P. The image forming device 202 according to the present embodiment can form an image read by the scanner unit 100 on the sheet P.

Figure 2:
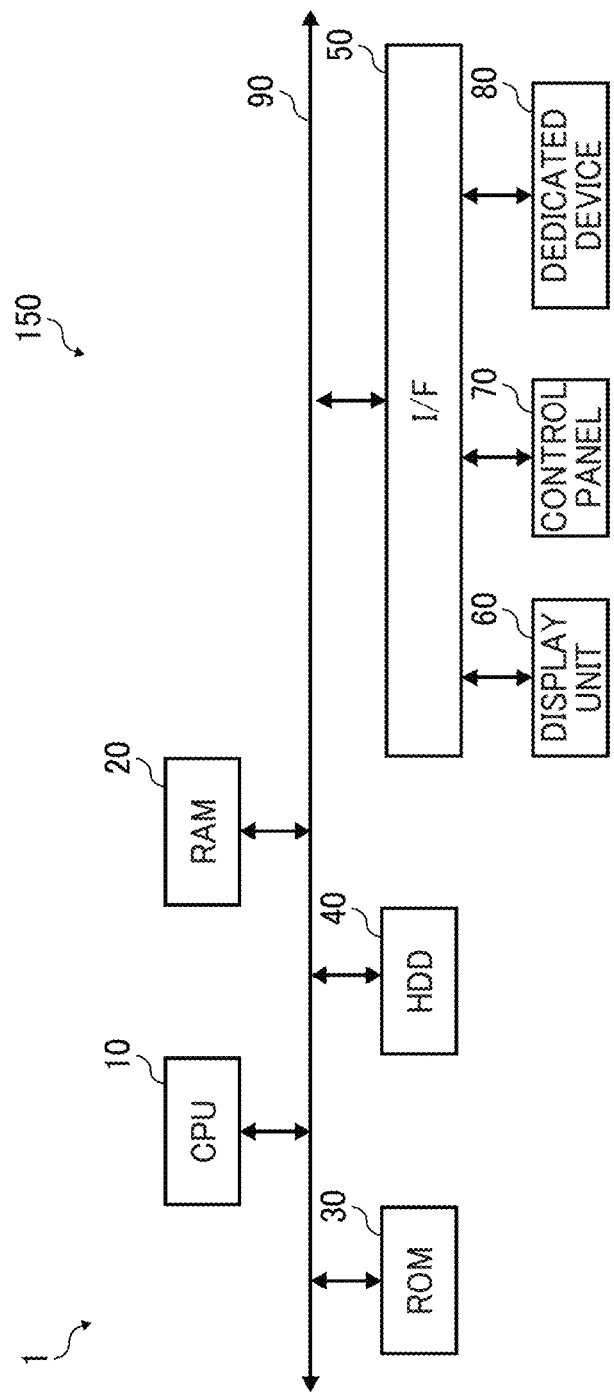
FIG. 2 is a diagram illustrating a hardware configuration of a controller provided for an MFP according to an embodiment of the present disclosure.

FIG. 2 is a diagram illustrating a hardware configuration of the controller 150 provided for the MFP 1 according to the present embodiment.

As illustrated in FIG. 2, the MFP 1 according to the present embodiment has a configuration similar to that of known information processing devices such as personal computers (PCs) and servers. In other words, a central processing unit (CPU) 10, a random access memory (RAM) 20, a read only memory (ROM) 30, a hard disk drive (HDD) 40, and an interface (IX) 50 are connected to each other through a bus 90 in the MFP 1 according to the present embodiment. The interface 50 is coupled to a display unit 60, an operation panel 70, and dedicated devices 80. The dedicated device 80 includes the scanner unit 100 and the image forming unit 200.

The CPU 10 is a computation unit that controls all operations of the MFP 1. The RAM 20 is a volatile memory where data can be read and written at high speed, and is used as a work area when the CPU 10 processes data. The ROM 30 is a read-only nonvolatile memory in which firmware programs or the like are stored. The HDD 40 is a data readable/writable nonvolatile memory in which, for example, an operating system (OS), various kinds of control programs such as an applied-voltage control program, and an application program are stored.

The interface (I/F) 50 connects, for example, various kinds of hardware and networks to the bus 90, and controls these elements. The display unit 60 according to the present embodiment is a user interface that allows a user to visually check the status of the MFP 1, and is implemented by a display device such as a liquid crystal display (LCD). The operation panel 70 is a user interface through which the data is input to the MFP 1.

In such a hardware configuration, the programs that are stored in the ROM 30 and the HDD 40, or in another recording medium such as an optical disk are read by the RAM 20, and the CPU 10 performs computation based on these programs loaded into the RAM 20. This series of processes configures a software controller. The software controller as configured above and hardware are combined to configure a functional block that implements the functions of the MFP 1 according to the present embodiment.

Figure 3:
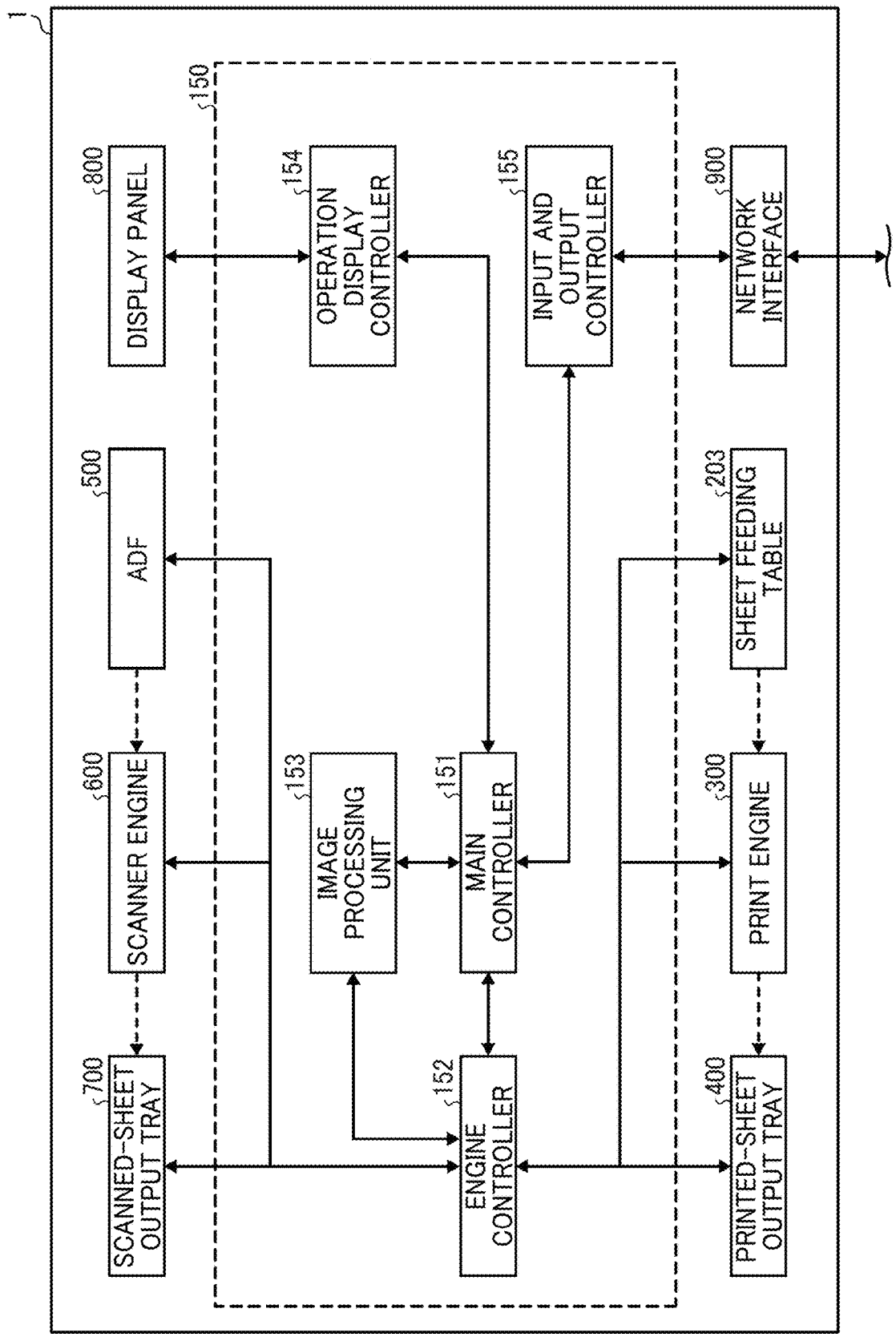
FIG. 3 is a schematic block diagram illustrating a functional configuration of an MFP according to an embodiment of the present disclosure.

FIG. 3 is a schematic block diagram illustrating a functional configuration of the multifunction peripheral (MFP) 1 according to the present embodiment.

In FIG. 3, electrical connections are indicated by solid-line arrows, and the flow of transfer sheets or a bundle of documents is indicated by arrows with broken lines.

As illustrated in FIG. 3, the MFP 1 according to the present embodiment includes a controller 150, a sheet feeding table 203, a print engine 300, a printed-sheet output tray 400, an automatic document feeder (ADF) 500, a scanner engine 600, a scanned-sheet output tray 700, a display panel 800, and a network interface (I/F) 900. The controller 150 according to the present embodiment includes a main controller 151, an engine controller 152, an image processing unit 153, an operation display controller 154, and an input and output controller 155.

The sheet feeding table 203 according to the present embodiment feeds a transfer sheet to the print engine 300 that serves as an image forming device. The print engine 300 serves as an image forming device that draws an image by forming and outputting an image on the transfer sheet conveyed from the sheet feeding table 203. The print engine 300 according to the present embodiment may be an image formation mechanism using an electrophotographic method. The transfer sheet on which an image has been formed by the print engine 300 is ejected to the printed-sheet output tray 400. The print engine 300 according to the present embodiment is implemented by the dedicated device 80 as illustrated in FIG. 2.

The ADF 500 automatically conveys the object to be scanned B to a position where the object to be scanned B can be scanned by the scanner engine 600 that executes some of the processes in the scanner unit 100. The scanner engine 600 according to the present embodiment is a document reading device including a photoelectric conversion element that converts the optical information into an electrical signal, and generates image data by optically scanning and reading the document automatically conveyed by the ADF 500 or the document placed on a document-stage glass. The document that is automatically conveyed by the ADF 500 and scanned by the scanner engine 600 is ejected to the scanned-sheet output tray 700. The ADF 500 and the scanner engine 600 according to the present embodiment are implemented by the dedicated devices 80 as illustrated in FIG. 2.

The display panel 800 is an output interface on which the status of the MFP 1 is visually displayed, and also is an input interface such as a touch panel through which the MFP 1 is directly operated and the data is input to the MFP 1. Moreover, the display panel 800 has a function to display an image through which the operation made by a user is received and accepted. The display panel 800 is implemented by the display unit 60 and the operation panel 70 as illustrated in FIG. 2.

The network interface 900 according to the present embodiment is an interface through which the MFP 1 communicates with other devices such as administrator terminals and personal computers (PCs) through the network, and interfaces such as Ethernet (registered trademark), universal serial bus (USB) interfaces, Bluetooth (registered trademark), wireless fidelity (Wi-Fi) (registered trademark), and FeliCa (registered trademark) are used. As described above, the MFP 1 according to the present embodiment receives the image data to be printed and various kinds of control commands such as a printing request from the terminals connected through the network interface 900. The network interface 900 is implemented by the interface 50 as illustrated in FIG. 2.

The controller 150 is configured by a combination of software and hardware. More specifically, the controller 150 is configured by the combination of hardware such as an integrated circuit and a software controller that is implemented as control programs such as the firmware stored in a nonvolatile memory such as the ROM 30 or the HDD 40 are loaded into the RAM 20 and the CPU 10 performs computation based on these loaded programs. The controller 150 serves as a controller that controls the entirety of the MFP 1. Accordingly, in the present embodiment, the controller 150 serves as an applied-voltage control device.

The main controller 151 plays a role in controlling the multiple elements of the controller 150, and gives a command to each one of the multiple elements of the controller 150. Moreover, the main controller 151 controls the input and output controller 155, and accesses other devices through the network interface 900 and the network. The engine controller 152 controls or drives a driver such as the print engine 300 and the scanner engine 600.

The image processing unit 153 according to the present embodiment is controlled by the main controller 151, and generates drawing information as output data based on the image data written in, for example, the page-description language (PDL). Such image data may be, for example, the documental data or image data included in the input print job. The drawing information is information such as cyan, magenta, yellow, and black (CMYK) bitmap data, and is used to draw an image to be formed when the print engine 300 that serves as an image forming device performs image-forming operation.

Further, the image processing unit 153 processes the data of imaging input from the scanner engine 600 to generate the image data. The generated image data is stored in the MFP 1 as the data obtained as a result of the scanning processes, or is sent to other devices through the network interface 900 or the network. Note that the MFP 1 according to the present embodiment can directly receive the drawing information instead of the image data and can form and output an image based on the directly-input drawing information.

The operation display controller 154 displays information on the display panel 800, or notifies the main controller 151 of the data input through the display panel 800. The input and output controller 155 inputs the signals and commands input through the network interface 900 and the network to the main controller 151.

A detailed configuration of the scanner unit 100 is described below.

Figure 4:
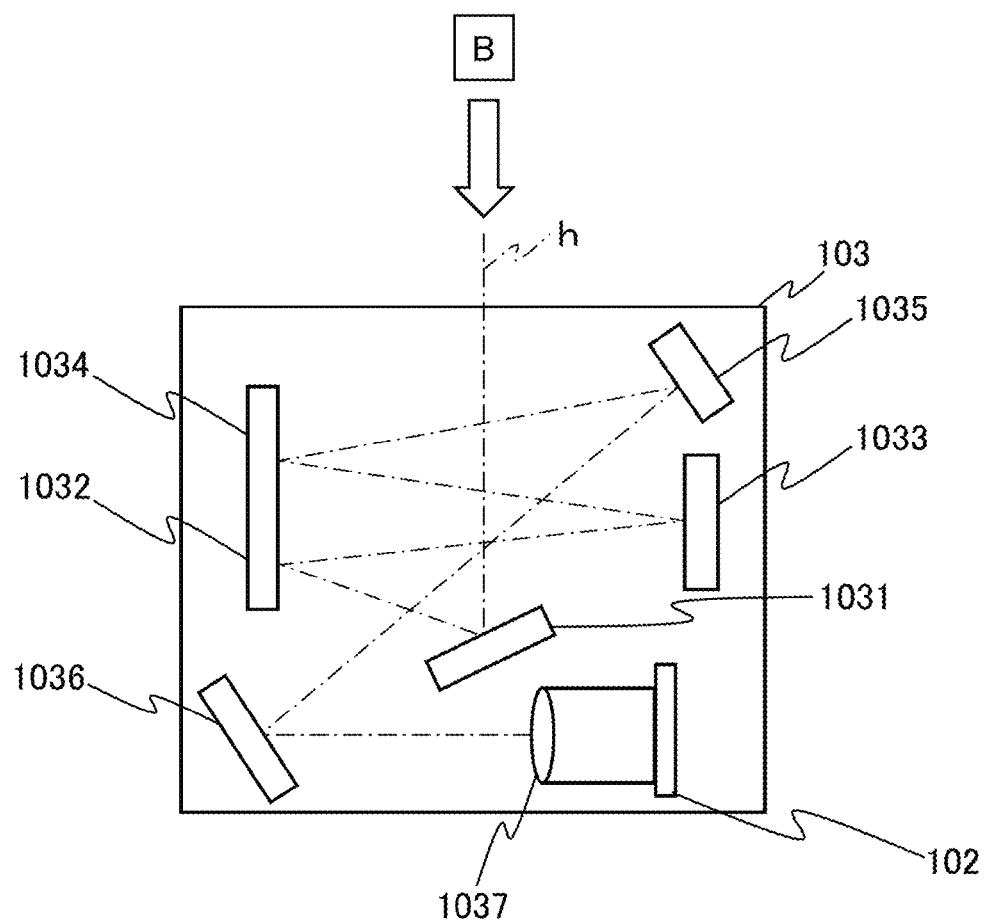
FIG. 4 is a diagram illustrating an outline of an optical system mounted on a carriage, according to an embodiment of the present disclosure.

FIG. 4 is a diagram illustrating an outline of an optical system mounted on the carriage 103, according to the present embodiment.

As illustrated in FIG. 4, the light that is emitted from the light source provided for the carriage 103 is reflected by the object to be scanned B, and the reflected light enters the reduction optical system along an optical path h. Then, the reflected light is reflected by a first mirror 1031.

The light reflected by the first mirror 1031 is reflected by the second mirror 1032, the third mirror 1033, the fourth mirror 1034, the fifth mirror 1035, and the sixth mirror 1036, passes through the lens 1037, and enters the optical sensor 102. The optical sensor 102 according to the present embodiment is, for example, a charge coupled device (CCD) sensor.

The image of the object to be scanned B is converted into an electrical signal based on the light detected by the optical sensor 102, and the controller 150 performs predetermined processing on the obtained electrical signal. As a result, the image data of the object to be scanned B is generated.

Figure 5A:
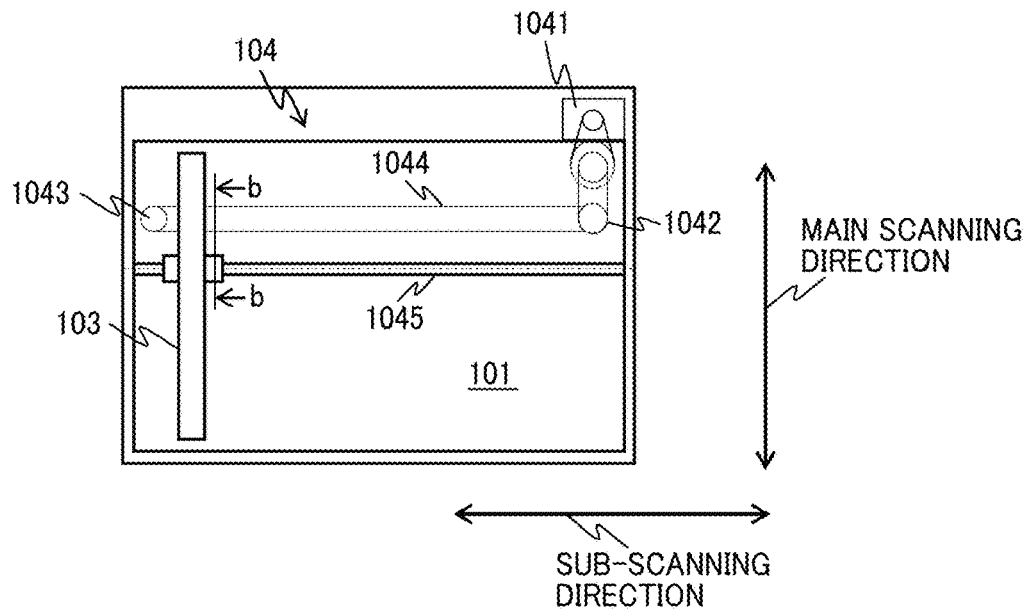
FIG. 5A, FIG. 5B, and FIG. 5C are diagrams each illustrating a cause that skews a carriage, according to an embodiment of the present disclosure.
Figure 5B:
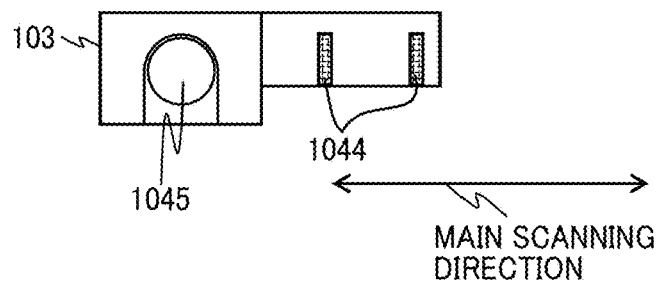
Figure 5C:
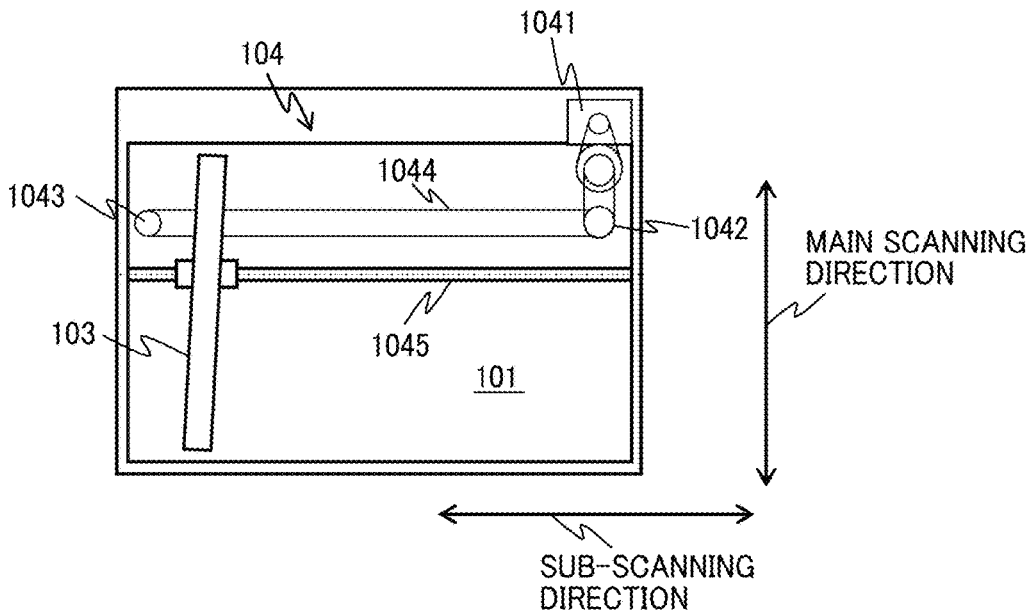

FIG. 5A, FIG. 5B, and FIG. 5C are diagrams each illustrating a cause that skews the carriage 103, according to the present embodiment.

As illustrated in FIG. 5A, FIG. 5B, and FIG. 5C, the scanner unit 100 further includes a driving mechanism 104 that moves the carriage 103 in the sub-scanning direction. The carriage 103 is extended in the main scanning direction, and is moved by the driving mechanism 104 in the sub-scanning direction.

As illustrated in FIG. 5A, the driving mechanism 104 includes a motor 1041, a driving pulley 1042, a driven pulley 1043, a timing belt 1044, and a guide rod 1045. The driving pulley 1042 and the driven pulley 1043 are disposed separately from each other in the sub-scanning direction. The timing belt 1044 is looped around the driving pulley 1042 and the driven pulley 1043, and is connected to the carriage 103. The guide rod 1045 extends in the sub-scanning direction and guides the movement of the carriage 103.

As the driving force of the motor 1041 is conveyed and the driving pulley 1042 rotates, the timing belt 1044 circulates between the driving pulley 1042 and the driven pulley 1043. As a result, the carriage 103 reciprocates in the sub-scanning direction as guided by the guide rod 1045.

As illustrated in FIG. 5B, in order for the carriage 103 to move along the guide rod 1045, a gap or play is required between the carriage 103 and the guide rod 1045. The timing belt 1044 and the guide rod 1045 are disposed separately from each other in the main scanning direction. The gap, backlash, or play between the carriage 103 and the guide rod 1045 may be present at the fitting part in the main scanning direction between the carriage 103 and the outer circumferential surface of the guide rod 1045. As a result, as illustrated in FIG. 5C, the carriage 103 that is moved by the driving force conveyed from the timing belt 1044 may move in an inclined manner with respect to the position of the guide rod 1045 that serves as a starting point.

In other words, the position where a force is applied to the carriage 103 in order to move the carriage 103 in the sub-scanning direction is near one of the pair of edges of the carriage 103 in the main scanning direction. Once the timing belt 1044 fixed onto the above position starts circulating, the ends of the carriage 103 tend to rotate in the circulating direction of the timing belt 1044 around the fitting part between the carriage 103 and the guide rod 1045. Due to such an operation, when the carriage 103 is inclined with reference to the posture when the carriage 103 is orthogonal to the guide rod 1045 while moving in the sub-scanning direction. As a result, when the scanning is performed on the object to be scanned B, scanning is performed while the carriage 103 is moving in the sub-scanning direction with the posture being inclined with respect to the desired posture in the main scanning direction.

FIG. 6 is a plan view of the scanner unit 100 according to the present embodiment in which the contact glass 101 is viewed from the mounting table on which the object to be scanned B is placed.

The rear side of the contact glass 101 as illustrated in FIG. 6 serves as the reading face of the contact glass 101. The rear side of the contact glass 101 corresponds to the A-side of the sheet in the depth direction.

As illustrated in FIG. 6, on the mounting table of the contact glass 101, a document-size reference line 1011 is indicated that serves as a reference position when the flat sheet-like object to be scanned B is placed.

In FIG. 6, the scanner unit 100 is in standby mode before the scanning operation is to be started. Accordingly, the carriage 103 is waiting at the carriage home position 1012. The carriage home position 1012 corresponds to a standby position before the carriage 103 starts the scanning operation.

The scanner unit 100 according to the present embodiment has a planar-medium's maximum scanning area 1013 that indicates the maximum range of image acquisition in which the object to be scanned B is scanned to obtain an image and a carriage's maximum scanning area 1014 that indicates the maximum range of movement in which the carriage 103 moves and the optical sensor 102 can perform scanning, and these areas of the scanner unit 100 are set in advance. In other words, the carriage's maximum scanning area 1014 is equivalent to the area that is surrounded by a pair of edges of the maximum range in which the carriage 103 moves for scanning at furthest and a pair of edges of the carriage home position 1012 on the other side.

In FIG. 6, the planar-medium's maximum scanning area 1013 when the object to be scanned B is a sheet P of A3 size is indicated by a shaded area.

FIG. 7 is a diagram illustrating an arrangement of the reference scale 105 provided for the scanner unit 100 according to the present embodiment.

As illustrated in FIG. 7, the reference scale 105 includes a main scanning direction scale 1051 and a sub-scanning direction scale 1052. As illustrated in FIG. 7, the main scanning direction scale 1051 extends in the main scanning direction outside the edge of the maximum-size document readable on the contact glass 101 in the sub-scanning direction. The sub-scanning direction scale 1052 extends in the sub-scanning direction outside the edge of the maximum-size document readable on the contact glass 101 in the main scanning direction.

Both the main scanning direction scale 1051 and the sub-scanning direction scale 1052 are arranged at positions corresponding to the outside of the planar-medium's maximum scanning area 1013 and the inside of the carriage's maximum scanning area 1014. As illustrated in FIG. 7, the reference scale 105 has ticks on the reading face on the contact glass 101, and such ticks of the scale serve as a reference when the dimensions of an object are measured. On the main scanning direction scale 1051, the ticks of the scale that extend in the sub-scanning direction are drawn at positions separated from each other in the main scanning direction. On the sub-scanning direction scale 1052, the ticks of the scale that extend in the main scanning direction are drawn at positions separated from each other in the sub-scanning direction.

The reference scale 105 according to the present embodiment may be disposed below the contact glass 101 around the carriage 103, or may be disposed above the contact glass 101 where the object to be scanned B is placed.

The degree of precision in the correction of the scanning by the optical sensor 102 is enhanced when the reference scale 105 is arranged on the mounting table of the object to be scanned B on the top face. As the reference scale 105 is used for correction of the optical sensor 102, ticks are to be arranged on the downside so as to face the carriage 103. In other words, the reference scale 105 may be arranged on both sides of the contact glass 101. If the reference scale 105 are arranged on both sides of the contact glass 101, the position of the reference scale 105 becomes visually recognizable, and the optical sensor 102 that faces the lower surface of the contact glass 101 in an upward direction can obtain the images of the reference scale 105 and the object to be scanned B at the same time.

Regarding the face of the reference scale 105 that is arranged to face the carriage 103, it is desired that the color indicating the ticks of the scale be different from the color of the base part on which the ticks of the scale are formed so as not to reflect the light emitted from the light source provided for the carriage 103. For example, the color of the lines indicating the ticks of the scale is made white using, for example, steel use stainless (SUS) polishing, and the degree of contrast of the lines on the image can be increased for increased visual recognizability.

Alternatively, steel use stainless (SUS) may be used as the material for the reference scale 105, and the ticks of the scale may be formed in black. Such a configuration does not affect the processes of simultaneously obtaining an image and the object to be scanned B.

FIG. 8 is a diagram illustrating a scanning range when the object to be scanned B is a three-dimensional object, according to the present embodiment.

As illustrated in FIG. 8, a part measurement range 1015 is arranged at a position different from the planar-medium's maximum scanning area 1013 that is the scanning range when the object to be scanned B is planar. A portion of the part measurement range 1015 in the sub-scanning direction around the turning point in the movement of the carriage 103 serves as a reference position for placement. As the range in the main scanning direction is set so as to be distributed with respect to the center of the optical path, the center point in the main scanning direction serves as a reference position for placement.

Regarding the moving direction of the carriage 103 in the sub-scanning direction and the optical direction in which the optical sensor 102 mounted on the carriage 103 optically scans the object to be scanned B in the main scanning direction, the positional displacement of the moving direction of the carriage 103 tends to be greater than the optical direction. In order to handle such a situation, the intervals at which the ticks of the sub-scanning direction scale 1052 are made narrower than the intervals at which the ticks of the main scanning direction scale 1051 to further enhance the precision of the measurement. In other words, in the reference scale 105, the sub-scanning direction scale 1052 is a finer scale than the main scanning direction scale 1051.

The corrective-value calculation processes to be performed by the scanner unit 100 are described below with reference to FIG. 9A, FIG. 9B, FIG. 9C, and FIG. 10.

Figure 9A:
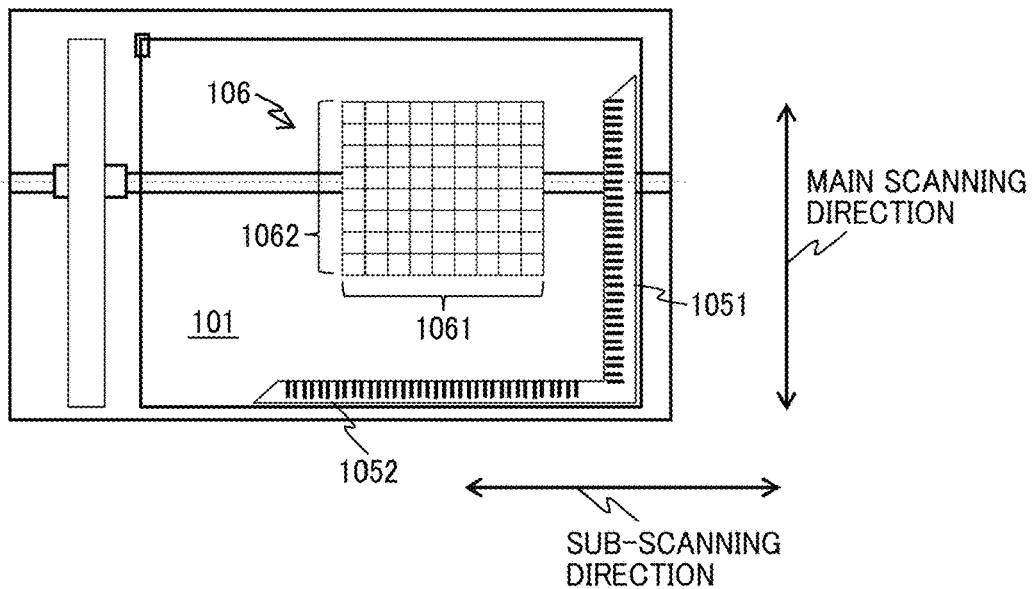
FIG. 9A, FIG. 9B, and FIG. 9C are diagrams illustrating the measuring processes for a part or component, a scanned image, and a registered image, respectively, according to an embodiment of the present disclosure.
Figure 9B:
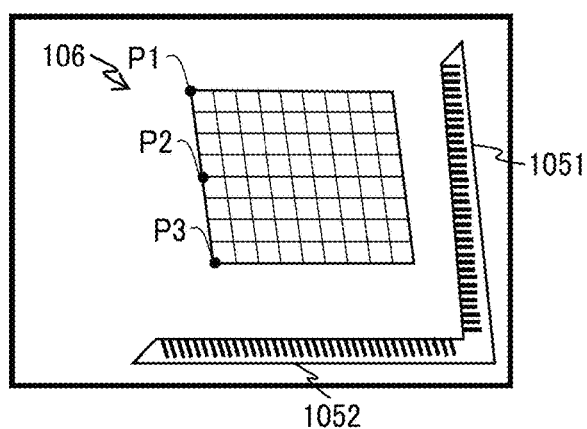
Figure 9C:
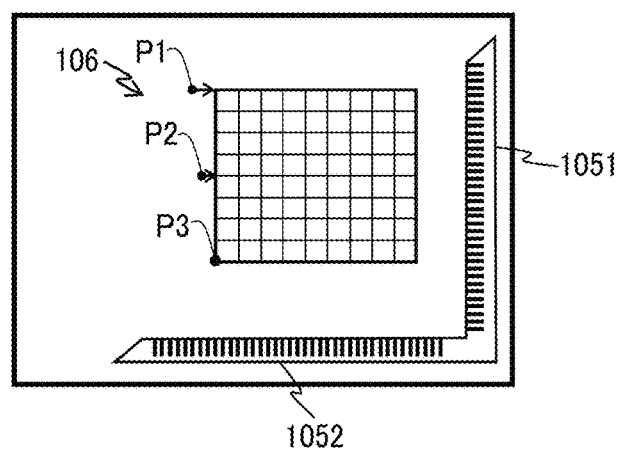

FIG. 9A, FIG. 9B, and FIG. 9C are diagrams illustrating the measuring processes for a part or component, a scanned image, and a registered image, respectively, according to the present embodiment.

Figure 10:
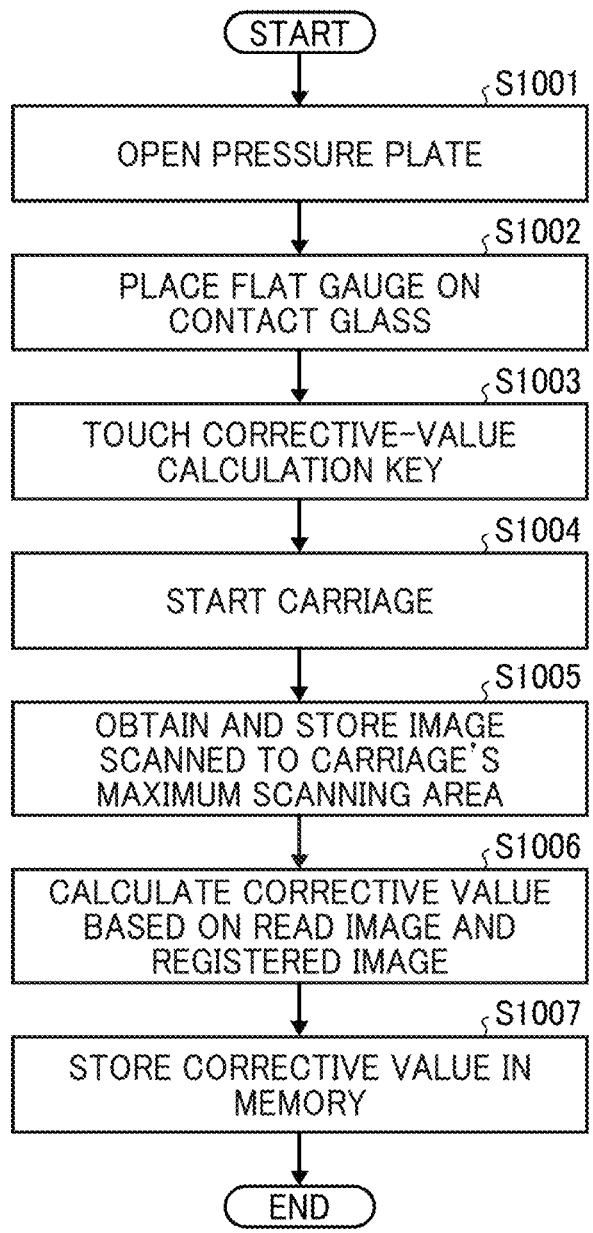
FIG. 10 is a flowchart of corrective-value calculation processes according to an embodiment of the present disclosure.

FIG. 10 is a flowchart of corrective-value calculation processes that can be performed in the scanner unit 100, according to the present embodiment.

Firstly, in a step S1001, a pressure plate is opened to place the object to be scanned B on the mounting table of the contact glass 101. The pressure plate according to the present embodiment in the configuration or structure that includes the ADF 500 is a plate-like component that covers the contact glass 101 to hold a flat object placed on the contact glass 101.

Subsequently, in a step S1002, a flat gauge 106 is placed on the mounting table of the contact glass 101. As illustrated in FIG. 9A, the flat gauge 106 according to the present embodiment is a sheet-like member such as a sheet of paper or a flat plate on which a plurality of first reference lines 1061 and a plurality of second reference lines 1062 are drawn.

The multiple first reference lines 1061 and the multiple second reference lines 1062 are arranged at positions separate from each other. Further, the multiple first reference lines 1061 and the multiple second reference lines 1062 extend in directions perpendicular to each other. In other words, the multiple first reference lines 1061 and the multiple second reference lines 1062 are arranged in a grid pattern on the flat gauge 106. The flat gauge 106 according to the present embodiment is arranged in the planar-medium's maximum scanning area 1013 where the multiple first reference lines 1061 are oriented in the main scanning direction and the multiple second reference lines 1062 are oriented in the sub-scanning direction.

Subsequently, in a step S1003, a corrective-value calculation key that is arranged on the operation panel 70 is touched or pressed down to start the scanning process. Once the scanning process starts, firstly, in a step S1004, the carriage 103 starts operating, and scans the object to be scanned B using the optical sensor 102 as the carriage 103 moves.

In a step S1005, corrective-value calculator scans the flat gauge 106 and the reference scale 105 while the carriage 103 is being moved to the carriage's maximum scanning area 1014, and obtains and stores the scanned image including the flat gauge 106 and the reference scale 105 in a storage area. In so doing, if the carriage 103 is skewed as illustrated in FIG. 5C while being moved, the scanned image that is obtained in the step S1005 is distorted as illustrated in FIG. 9B.

On the other hand, as illustrated in FIG. 9C, the registered image is stored in the HDD 40 that serves as a memory.

The registered image includes the reference scale 105 and the flat gauge 106 in which the multiple first reference lines 1061 are oriented in the main scanning direction and the multiple second reference lines 1062 are oriented in the sub-scanning direction. In other words, the registered image is an image of the state as illustrated in FIG. 9A, and the distortion or deformation therein is corrected in the registered image. The registered image is generated in advance and stored in the HDD 40.

Subsequently, in a step S1006, the corrective-value calculator compares the scanned image illustrated in FIG. 9B with the registered image illustrated in FIG. 9C to calculate a corrective value. The corrective value according to the present embodiment is a numerical value that indicates the amount of movement for each pixel of the scanned image to move such that the scanned image obtained by the optical sensor 102 will move to get close to or match the registered image stored in the HDD 40.

More specifically, the corrective-value calculator specifies a corresponding pixel in the registered image, which indicates the same portion of the image, for each of a plurality of pixels that make up the scanned image. Subsequently, the corrective-value calculator calculates as a corrective value the amount of misalignment or the amount of movement of the pairs of pixels that correspond to each other between the scanned image and the registered image.

For example, in FIG. 9B and FIG. 9C, the pixel P1 and the pixel P2 are moved by the length indicated by each arrow based on the corrective values for the pixel P1 and the pixel P2, respectively, in the direction indicated by each arrow. On the other hand, the corrective value for the pixel P3 is zero as the pixel in FIG. 9B matches the pixel in FIG. 9C. In other words, the corrective value may differ for each one of the pixels. Then, in a step S1007, the corrective-value calculator stores the calculated corrective value in the HDD 40.

The corrective-value calculator may calculate a corrective value for each one of all the pixels that make up the scanned image, or may calculate a corrective value for each set of a plurality of adjacent pixels. Such a corrective value for each set of a plurality of adjacent pixels may be referred to as a pixel block in the following description. Alternatively, the corrective-value calculator may calculate a corrective value for each row of pixels that are adjacent to each other in the sub-scanning direction. As a method of processing an image using a corrective-value calculator is known in the art, its detailed description is omitted.

The processes that are described with reference to FIG. 9A, FIG. 9B, FIG. 9C, and FIG. 10, which are performed by the corrective-value calculator, are implemented by the computation executable in the main controller 151 and the image processing unit 153. In the above-described process, the image processing unit 153 performs a process of specifying each image portion on the scanned image including the reference scale 105 and the flat gauge 106. The results of the above processes are passed to the main controller 151, and the main controller 151 executes the processes of computing the corrective value.

The measuring processes for a part or component to be performed by the scanner unit 100 are described below with reference to FIG. 11A and FIG. 11B.

Figure 11A:
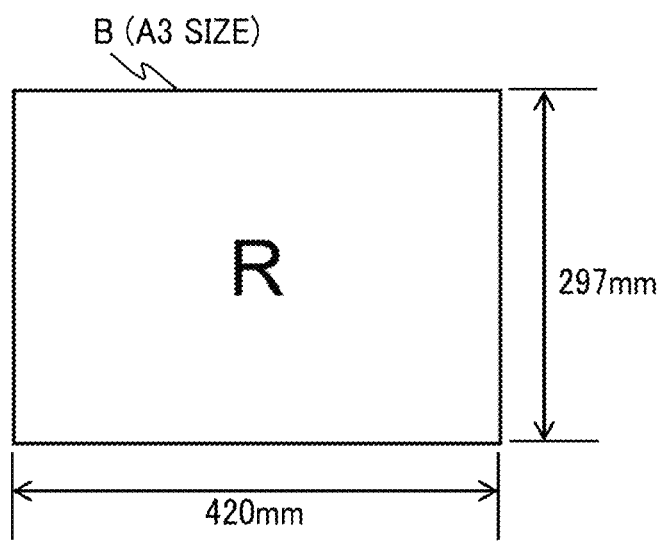
FIG. 11A and FIG. 11B are diagrams each illustrating the operation of a scanner unit according to an embodiment of the present disclosure.
Figure 11B:
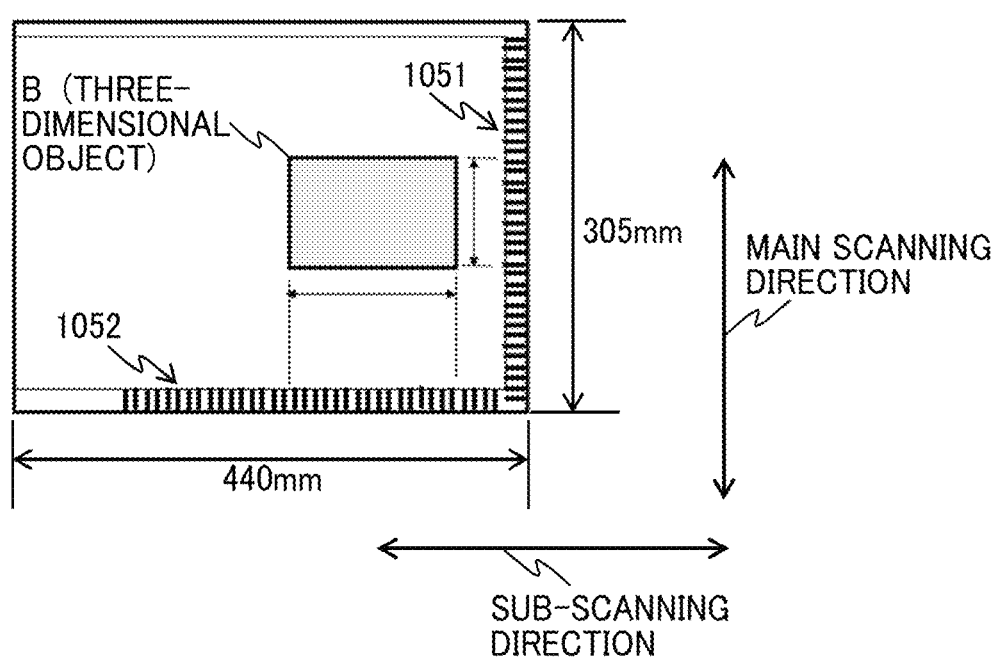

FIG. 11A and FIG. 11B are diagrams each illustrating the operation of the scanner unit 100 according to the present embodiment.

FIG. 11A illustrates an image obtained by performing the scanning processes on the object to be scanned B when the object to be scanned B is a flat object and is a sheet P of A3 size.

In this case, an image is obtained in a range of 420 mm×297 mm.

In the present embodiment described with reference to FIG. 11B, the object to be scanned B is a three-dimensional object and scanning is performed to a movable range of the carriage 103 to obtain an image of the object.

In this case, for example, an image of the object to be scanned B and an image of the reference scale 105 are simultaneously obtained from a range of 440 mm×305 mm.

Then, the image portion of the reference scale 105 is compared with the image portion of the object to be scanned B included in the obtained image, and the dimensions of the object to be scanned B are measured.

Figure 12:
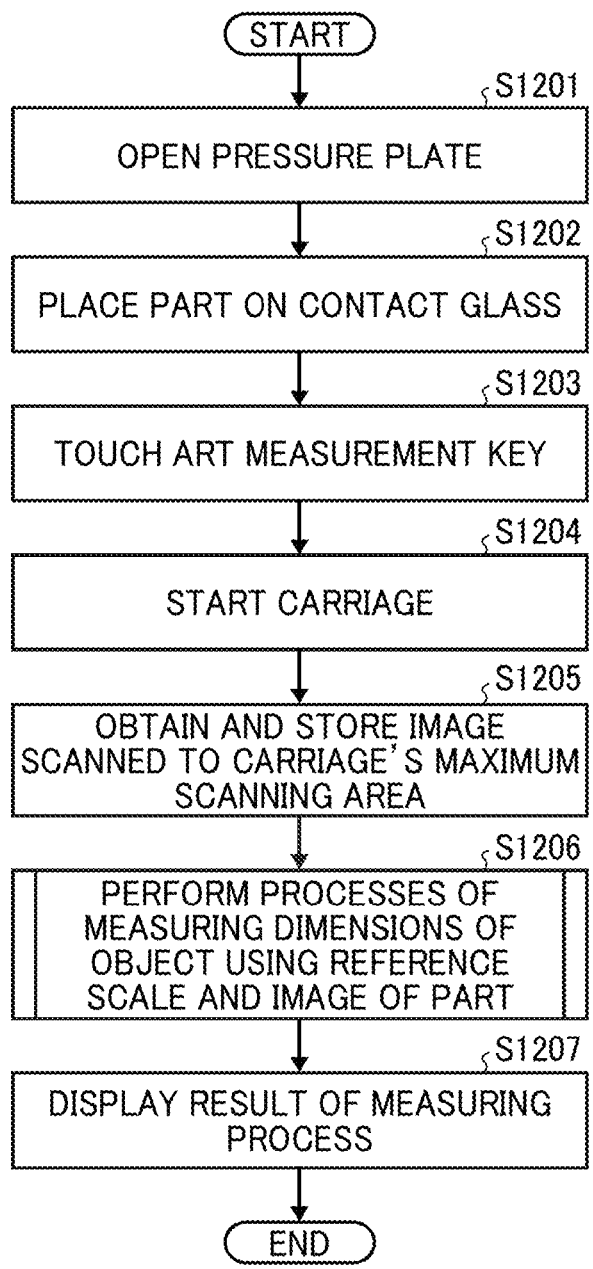
FIG. 12 is a flowchart of the measuring processes for a part or component, according to an embodiment of the present disclosure.

FIG. 12 is a flowchart of the measuring processes for a part or component that can be performed by the scanner unit 100, according to the present embodiment.

The flowchart in FIG. 12 illustrates a case in which the object to be scanned B is a three-dimensional object.

Firstly, in a step S1201, the pressure plate is opened to place the object to be scanned B on the mounting table of the contact glass 101. Subsequently, in a step S1202; the object to be scanned B is placed on the mounting table of the contact glass 101.

Subsequently, in a step S1203, a part measurement key that is arranged on the operation panel 70 is touched or pressed down to start the scanning process. Once the scanning process starts, firstly, in a step S1204, the carriage 103 starts operating, and the optical sensor 102 starts scanning the object to be scanned B as the carriage 103 moves.

In a step S1205, the object to be scanned B is scanned by a dimension computation unit while the carriage 103 is being moved to the carriage's maximum scanning area 1014. As a result, the dimension computation unit obtains a measured image including the object to be scanned B and the reference scale 105, and stores the measured image in a storage area.

Figure 13:
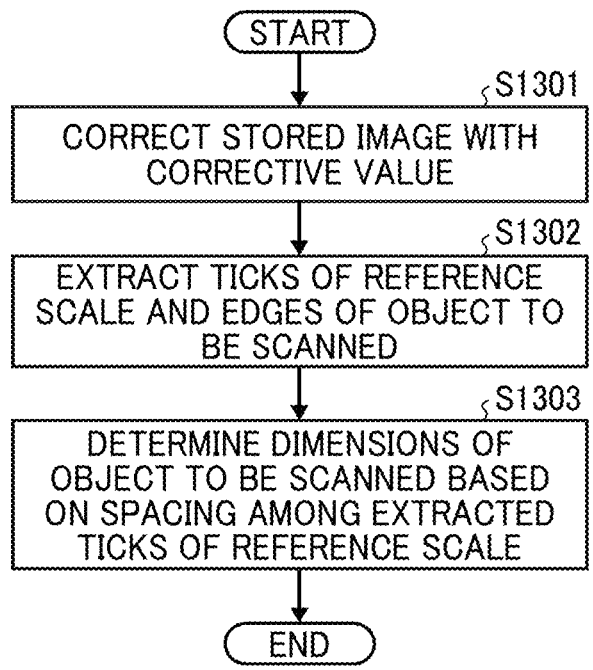
FIG. 13 is a flowchart of the processes of measuring the dimensions of an object, according to an embodiment of the present disclosure.

FIG. 13 is a flowchart of the processes of measuring the dimensions of an object, according to the present embodiment.

Subsequently, in a step S1206 as illustrated in FIG. 13, the dimension computation unit performs the processes of measuring the dimensions of an object. In the processes of measuring the dimensions of an object, the measured image is corrected, and the portion of the reference scale 105 and the portion of the object to be scanned B that are included in the corrected measured image are specified. By comparing these specified images with each other, the dimensions of the object to be scanned B can be measured. FIG. 13 is a flowchart of the processes executed in the step S1206 where the dimensions of an object are measured, according to the present embodiment.

Firstly, in a step S1301, the dimension computation unit corrects the measured image obtained in the step S1205 with the corrective value calculated in the step S1006. More specifically, the dimension computation unit moves the multiple pixels of the measurement image based on a corresponding corrective value. As a result, a corrected image in which the distortion of the measured image has been corrected is generated.

Subsequently, in a step S1302, the dimension computation unit extracts the ticks of the reference scale 105 and the edges of the object to be scanned B from the corrected image. As a method of extracting a specific portion from the corrected image, such as edge detection, is known in the art, its detailed description is omitted.

Subsequently, in a step S1303, the dimension computation unit determines the dimensions of the extracted object to be scanned B based on the spacing among the extracted ticks of the reference scale 105. More specifically, the dimension computation unit multiplies the predetermined interval of the ticks of the scale in micrometer (μm) by the number of ticks of the scale facing the contours of the object to be scanned B whose dimensions are to be specified. As a result, the dimensions of the object can be determined. When at least one of the edges of the object to be scanned B is positioned between the adjacent pairs of ticks of the scale, the dimension computation unit prorates the number of pixels between such adjacent pairs of ticks of the scale. As the concrete processes of determining the dimensions of an object are known in the related art, its detailed description is omitted.

Finally, in a step S1207 as illustrated in FIG. 12, a dimension measuring device displays the result of the measuring process on the display unit 60, and terminates the scanning processes of a three-dimensional object.

A method of determining the various kinds of dimensions of objects to be scanned B1, B2, and B3 in the step S1303 is described below with reference to FIG. 14A, FIG. 14B, and FIG. 14C.

Figure 14A:
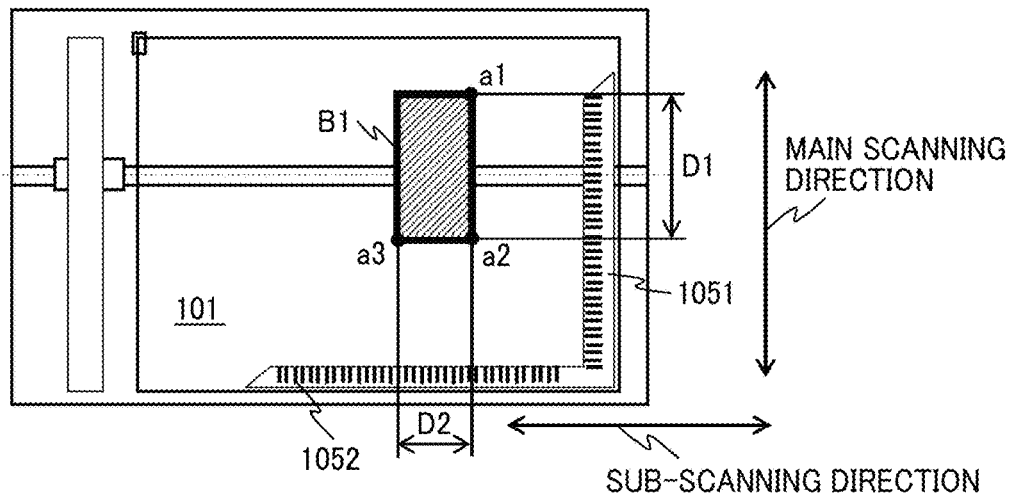
FIG. 14A, FIG. 14B, and FIG. 14C are diagrams each illustrating a corrected image including various kinds of objects to be scanned and a reference scale, according to an embodiment of the present disclosure.
Figure 14B:
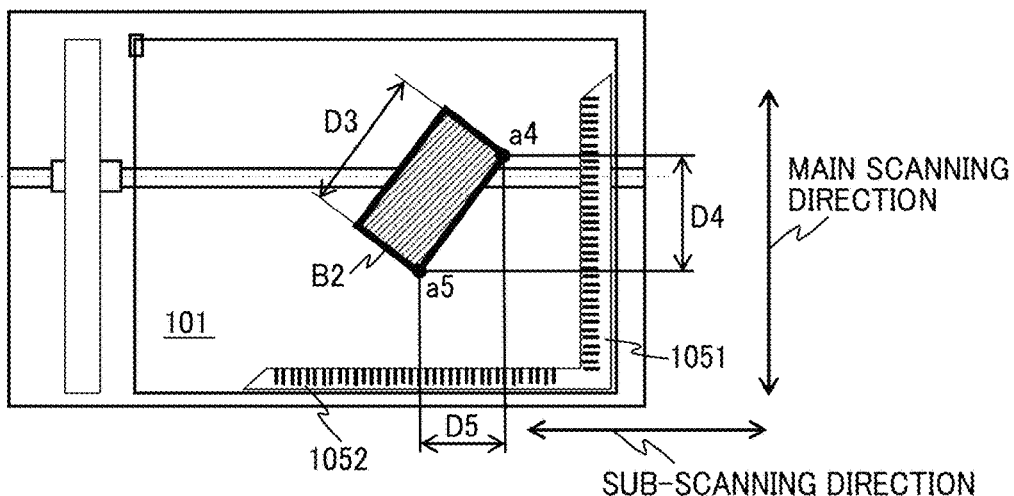
Figure 14C:
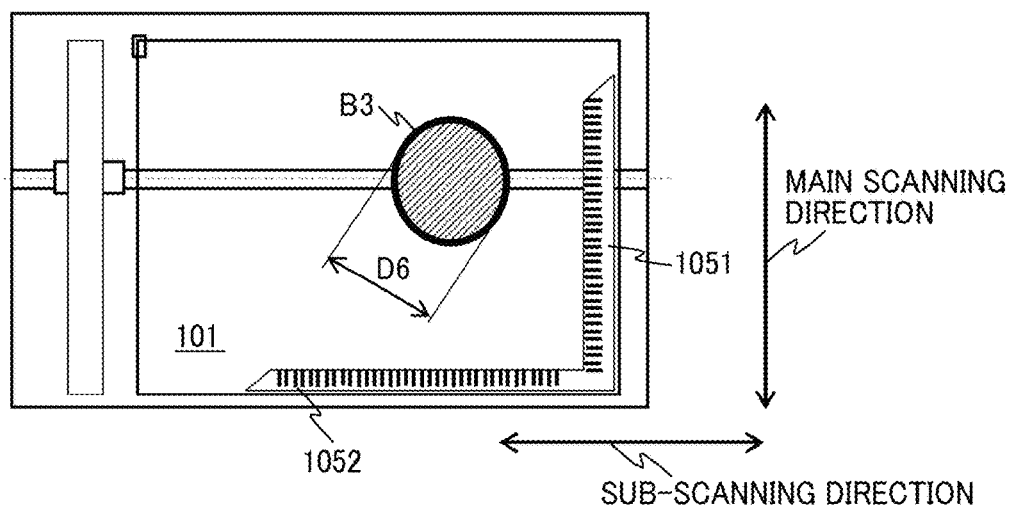

FIG. 14A, FIG. 14B, and FIG. 14C are diagrams each illustrating a corrected image including various kinds of objects to be scanned B1 B2, and B3 and the reference scale 105, according to the present embodiment.

As illustrated in FIG. 14A, when the dimension D1 of the object to be scanned B1 having a rectangular shape is to be determined, the dimension computation unit counts the number of the ticks of the main scanning direction scale 1051 between a vertex a1 and a vertex a2 of the object to be scanned B1. When the dimension D2 of the object to be scanned B1 is to be determined, the dimension computation unit counts the number of the ticks of the sub-scanning direction scale 1052 between the vertex a2 and a vertex a3 of the object to be scanned B1.

As illustrated in FIG. 14B, when the dimension D3 of the object to be scanned B2 having a rectangular shape is to be determined, the dimension computation unit determines a dimension D4 between a vertex a4 and a vertex a5 of the object to be scanned B1 in the main scanning direction and a dimension D5 between the vertex a4 and the vertex a5 of the object to be scanned B1 in the sub-scanning direction. A method of determining the dimension D4 and the dimension D5 is similar to the method described with reference to FIG. 14A.

Then, the dimension computation unit determines the dimension D3 based on the dimension D4 and the dimension D5 using the Pythagorean theorem.

As illustrated in FIG. 14C, when the diameter D6 of the object to be scanned B3 having a circular shape is to be determined, the dimension computation unit adopts a method similar to the method described as above with reference to FIG. 14A to determine the maximum dimension of the object to be scanned B3 in the main scanning direction and the maximum dimension of the object to be scanned B3 in the sub-scanning direction. Then, the dimension computation unit obtains the average of the maximum size in the main scanning direction and the maximum size in the sub-scanning direction, and determines the obtained average to be the diameter D6.

Figure 15:
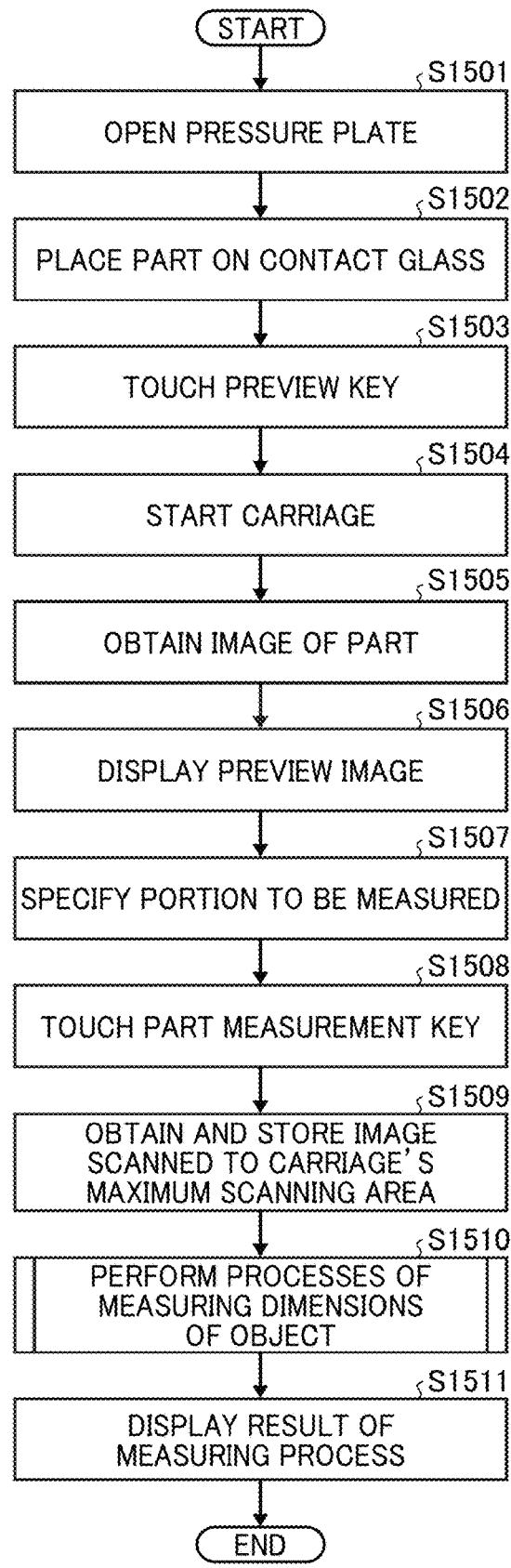
FIG. 15 is a flowchart of the measuring processes for a part or component, according to an alternative embodiment of the present disclosure.

FIG. 15 is a flowchart of the measuring processes for a part or component that can be performed by the scanner unit 100, according to an alternative embodiment of the present disclosure.

The flowchart in FIG. 15 illustrates the processes to be performed when the object to be scanned B is a three-dimensional object and a desired portion to be measured is specified.

In a similar manner to the first case of the present disclosure as described above, firstly, in a step S1501, the pressure plate is opened to place the object to be scanned B on the mounting table of the contact glass 101, and then, in a step S1502, the object to be scanned B is placed on the mounting table of the contact glass 101. Subsequently, in a step S1503, a preview key that is arranged on the operation panel 70 is touched or pressed down to start a preview process.

In the preview process, only the image of the object to be scanned B is obtained, and the obtained image is displayed on the display unit 60 as a preview. In other words, firstly, in a steps S1504, the dimension measuring device drives the carriage 103 to operate, and scans the object to be scanned B using the optical sensor 102 as the carriage 103 moves. In a step S1505, the scanner unit 100 according to the present embodiment scans the object to be scanned B in the part measurement range 1015 in which the object to be scanned B is to be scanned while moving the carriage 103, and obtains the image of the object to be scanned B at the same time. Then, the obtained image of the object to be scanned B is stored in the storage area.

Subsequently, in a step S1506, the dimension measuring device causes the display unit 60 to display the image stored in the storage area as a preview image. Then, in a step S1507, the portion to be measured on the image displayed on the display unit 60 is determined through the operation panel 70. After the portion to be measured is specified, in a step S1508, the part measurement key that is arranged on the operation panel 70 is touched or pressed down to start the scanning process.

Once the scanning process starts, the scanner unit 100 according to the present embodiment scans the object to be scanned B using the optical sensor 102 as the carriage 103 moves, and such scanning of the object to be scanned B is carried out while the carriage 103 is being moved to the carriage's maximum scanning area 1014. As a result, the measured images including the image of the reference scale 105 and the image of the object to be scanned B within range of the specified portion to be measured can be obtained, and in a step S1509, the dimension measuring device stores the obtained images in the storage area.

Subsequently, in a step S1510, the dimension measuring device performs processes of measuring the dimensions of an object as illustrated in FIG. 13. Finally, in a step S1511, the dimension measuring device displays the result of the measuring process on the display unit 60, and terminates the scanning processes of a three-dimensional object.

The processes that are described with reference to FIG. 12, FIG. 13, and FIG. 15, which are performed by the dimension computation unit, are implemented by the computation executable in the main controller 151 and the image processing unit 153. In the above-described process, the image processing unit 153 performs the processes of determining the image portions of the object to be scanned B and the reference scale 105 on the scanned image obtained by simultaneously obtaining the images of the object to be scanned B and the reference scale 105. The results of the above processes are passed to the main controller 151, and the main controller 151 executes the processes of computing the dimensions of the object.

According to the present embodiment, the measurement image is corrected using the corrective value calculated using the flat gauge 106. Accordingly, the accuracy of measurement of the dimensions of the object to be scanned B using the reference scale 105 can be prevented from deteriorating.

According to the above-described embodiment, the multiple first reference lines 1061 and the multiple second reference lines 1062 orthogonal to each other are added to the flat gauge 106. As a result, the corrective value in the main scanning direction and the corrective value in the sub-scanning direction can be calculated at the same time. As a result, the measurement image can be corrected with a high degree of precision. However, when the carriage 103 is skewed as illustrated in FIG. 5A, FIG. 5B, and FIG. 5C, it is sufficient as long as the multiple first reference lines 1061 are drawn on the flat gauge 106 and the corrective value in the sub-scanning direction is obtained.

In the processes of measuring the dimensions of an object described as above with reference to FIG. 13, after the entirety of the measured image is corrected, the ticks of the reference scale 105 and the edges of the object to be scanned B are extracted from the corrected image. However, the procedure according to the above embodiments of the present disclosure is not limited thereby. Alternatively, the dimension computation unit may correct only the extracted portion using the corrective value after the reference scale 105 and the object to be scanned B are extracted from the measured image. As a result, it is sufficient as long as a desired portion in the measured image is selectively corrected, and the processing speed can be increased.

In the above embodiments of the present disclosure, the corrective-value calculation processes that are described as above with reference to FIG. 10 are performed when the corrective-value calculation key that is arranged on the operation panel 70 is touched or pressed down. Due to such a configuration, when the environment in which the MFP 1 is installed is changed, instructions to perform the corrective-value calculation processes can be given in an explicit manner. Note also that the timing at which the corrective-value calculation processes are performed is not limited to the timing according to the above-described embodiments of the present disclosure.

Alternatively, the controller 150 may perform the corrective-value calculation processes described as above with reference to FIG. 10 in response to the length of time elapsed since the scanner unit 100 of the MFP 1 started operating exceeding a predetermined operating time, and may then update the corrective value that is stored in the HDD 40. As a result, a corrective value can appropriately be calculated in accordance with the wear and tear or the deterioration over time of a driving component or a sliding component.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A reading device comprising:
a carriage movable in a sub-scanning direction;
an optical sensor mounted on the carriage, the optical sensor being configured to scan an object placed on a contact glass;
a reference scale used as a reference when a dimension of the object is computed based on an image obtained as the optical sensor scans the object;
a flat gauge to be scanned by the optical sensor to calculate a corrective value used to correct the image obtained by the optical sensor; and
circuitry configured to
calculate the corrective value based on a scanned image including the reference scale and the flat gauge obtained by the optical sensor, and
correct, based on the corrective value, a measurement image including an image of the object and an image of the reference scale obtained by the optical sensor and compute the dimension of the object based on the corrected measurement image,
wherein the reference scale extends in a main scanning direction orthogonal to the sub-scanning direction outside a range of image acquisition in which the optical sensor scans the object to obtain the image of the object as the carriage moves and inside a maximum movement range in which the carriage is movable and the optical sensor obtains the image of the object, and
wherein the flat gauge is arranged on the contact glass inside the range of image acquisition, where a plurality of first reference lines drawn on a face of the contact glass are oriented in the main scanning direction.

2. The reading device according to claim 1,
wherein the reference scale has a plurality of ticks extending in the sub-scanning direction, the plurality of ticks of the reference scale being drawn at positions separated from each other in the main scanning direction.

3. The reading device according to claim 2,
wherein the reference scale extends in the sub-scanning direction and has a plurality of ticks extending in the main scanning direction, the plurality of ticks of the reference scale being drawn at positions separated from each other in the sub-scanning direction.

4. The reading device according to claim 3,
wherein the flat gauge includes the plurality of first reference lines being parallel to each other and a plurality of second reference lines orthogonal to the plurality of first reference lines, and the plurality of second reference lines are parallel to each other.

5. The reading device according to claim 1,
wherein the flat gauge is smaller than the range of image acquisition.

6. The reading device according to claim 1, further comprising
a memory that stores a registered image including the reference scale and the flat gauge where the plurality of first reference lines are oriented in the main scanning direction,
wherein the circuitry is configured to calculate the corrective value indicating an amount of movement for each pixel of the scanned image to make the scanned image obtained by the optical sensor close to the registered image stored in the memory.

7. The reading device according to claim 6,
wherein the circuitry is configured to update the corrective value in response to a length of time elapsed since the reading device started operating exceeding a predetermined operating time.

8. An image forming apparatus comprising:
the reading device according to claim 1; and
an image forming device configured to form an image obtained by the reading device on a sheet-like recording medium.

* * * * *